(12) United States Patent
Mitchell

(10) Patent No.: US 7,653,674 B2
(45) Date of Patent: Jan. 26, 2010

(54) PARALLEL OPERATIONS ON MULTIPLE SIGNED ELEMENTS IN A REGISTER

(75) Inventor: Joan LaVerne Mitchell, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 1033 days.

(21) Appl. No.: 11/068,328

(22) Filed: Feb. 28, 2005

(65) Prior Publication Data

US 2006/0080378 A1   Apr. 13, 2006

Related U.S. Application Data

(60) Provisional application No. 60/616,689, filed on Oct. 7, 2004.

(51) Int. Cl.
*G06F 5/00*   (2006.01)

(52) U.S. Cl. ........................................... 708/204

(58) Field of Classification Search .................. None
See application file for complete search history.

(56) References Cited

U.S. PATENT DOCUMENTS

| 6,834,337 B1 | 12/2004 | Mitchell et al. | |
|---|---|---|---|
| 7,039,906 B1 * | 5/2006 | Trelewicz et al. | 717/149 |
| 2003/0050941 A1 * | 3/2003 | Roussel | 707/500 |
| 2004/0133617 A1 * | 7/2004 | Chen et al. | 708/523 |

* cited by examiner

*Primary Examiner*—David H Malzahn
(74) *Attorney, Agent, or Firm*—Duft Bornsen & Fishman LLP

(57) ABSTRACT

The present invention provides methods, apparatus, and article of manufacture for performing parallel operations on multiple signed elements which have been packed into a binary value, each element being associated with a different set of bits. A signs binary value is obtained which contains the sign bits for each element in the register. The signs binary value is then used to remove and/or restore sign bits to each element in single operations. This enables parallel operations to be performed efficiently on multiple signed elements loaded into a register, without incurring loss of data.

31 Claims, 9 Drawing Sheets

```
207 ——— 111101 111010 111111 111000   R (Dependent -2,-5,0,-8)
231 ——— 100000 100000 100000 100000   Mask
        ----------------------------  AND
232 ——— 100000 100000 100000 100000   Signs = R AND Mask
207 ——— 111101 111010 111111 111000   R
        ----------------------------  ADD
233 ——— 011110 011011 100000 011000   R = R + Signs
232 ——— 100000 100000 100000 100000   Signs
        ----------------------------  XOR
221 ——— 111110 111011 000000 111000   R = R XOR Signs
                                       (independent -2,-5,0,-8)
```

Fig. 2a

201 — 111110 000000 000000 000000    -2 << 18
202 — 111111 111011 000000 000000    -5 << 12
                                      ADD
- - - - - - - - - - - - - - - - - - - - - - -
203 — 111101 111011 000000 000000
204 — 000000 000000 000000 000000    0 << 6
                                      ADD
- - - - - - - - - - - - - - - - - - - - - - -
205 — 111101 111011 000000 000000
206 — 111111 111111 111111 111000    -8
                                      ADD
- - - - - - - - - - - - - - - - - - - - - - -
207 — 111101 111010 111111 111000    (Dependent -2,-5,0,-8)

| | | |
|---|---|---|
| 207 — | 111101 111010 111111 111000 | R = (Dependent -2,-5,0,-8) |
| 210 — | 000000 000000 000000 100000 | 1st element sign mask |
| | | AND |
| 211 — | 000000 000000 000000 100000 | Sign = R AND 1st element sign mask |
| | | SL1 |
| 212 — | 000000 000000 000001 000000 | Sign = Sign << 1 |
| 207 — | 111101 111010 111111 111000 | R |
| | | ADD |
| 213 — | 111101 111011 000000 111000 | R = R + Sign |
| 214 — | 000000 000000 100000 000000 | 2nd element sign mask |
| | | AND |
| 215 — | 000000 000000 000000 000000 | Sign = R AND 2nd element sign mask |
| | | SL1 |
| 216 — | 000000 000000 000000 000000 | Sign = Sign << 1 |
| 213 — | 111101 111011 000000 111000 | R |
| | | ADD |
| 217 — | 111101 111011 000000 111000 | R = R + Sign |
| 218 — | 000000 100000 000000 000000 | 3rd element sign mask |
| | | AND |
| 219 — | 000000 100000 000000 000000 | Sign = R AND 3rd element sign mask |
| | | SL1 |
| 220 — | 000001 000000 000000 000000 | Sign = Sign << 1 |
| 217 — | 111101 111011 000000 111000 | R |
| | | ADD |
| 221 — | 111110 111011 000000 111000 | R = R + Sign |
| | | (Independant. -2,-5,0,-8) |

```
207 ——— 111101 111010 111111 111000    R (Dependent -2,-5,0,-8)
231 ——— 100000 100000 100000 100000    Mask
                                        AND
        ----------------------------------
232 ——— 100000 100000 100000 100000    Signs = R AND Mask
207 ——— 111101 111010 111111 111000    R
                                        ADD
        ----------------------------------
233 ——— 011110 011011 100000 011000    R = R + signs
```

Fig. 3

```
207 ──── 111101 111010 111111 111000    R (Dependent -2,-5,0,-8)
231 ──── 100000 100000 100000 100000    Mask
                                        AND
─────────────────────────────────────
232 ──── 100000 100000 100000 100000    Signs = R AND Mask
207 ──── 111101 111010 111111 111000    R
                                        ADD
─────────────────────────────────────
233 ──── 011110 011011 100000 011000    R = R + Signs
232 ──── 100000 100000 100000 100000    Signs
                                        XOR
─────────────────────────────────────
221 ──── 111110 111011 000000 111000    R = R XOR Signs
                                        (independent -2,-5,0,-8)
```

Fig. 4

```
221 ——  111110 111011 000000 111000      R (independent -2,-5,0,-8)
231 ——  100000 100000 100000 100000      Mask
                                         AND
        ─────────────────────────
401 ——  100000 100000 000000 100000      Signs = R AND Mask
                                         SLL 1
402 ——  000001 000000 000000 000000      Signs = Signs << 1

221 ——  111110 111011 000000 111000      R (independent -2,-5,0,-8)
402 ——  000001 000000 000001 000000      Signs
                                         SUBTRACT
        ─────────────────────────
207 ——  111101 111010 111111 111000      R = R - Signs
                                         (dependent -2,-5,0,-8)
```

Fig. 5

```
207 ——— 111101 111010 111111 111000    R (dependent -2,-5,0,-8)
231 ——— 100000 100000 100000 100000    Mask
                                        AND
232 ——— 100000 100000 100000 100000    Signs = R AND Mask
207 ——— 111101 111010 111111 111000    R
                                        ADD
233 ——— 011110 011011 100000 011000    R = R + Signs
501 ——— 000001 000001 000001 000001    Bit Mask
                                        OR
502 ——— 011111 011011 100001 011001    R = R OR Bit Mask
232 ——— 100000 100000 100000 100000    Signs
                                        SUBTRACT
503 ——— 111110 111011 000000 111001    R = R - Signs (dependent -1,-5, 1, -7)
```

Fig. 6

```
207 ——— 111101 111010 111111 111000    R (dependent -2,-5,0,-8)
231 ——— 100000 100000 100000 100000    Mask
                                       AND
232 ——— 100000 100000 100000 100000    Signs = R AND Mask
207 ——— 111101 111010 111111 111000    R
                                       ADD
233 ——— 011110 011011 100000 011000    R = R + Signs
601 ——— 111100 111100 111100 111100    Clear2
                                       AND
602 ——— 011100 011000 100000 011000    R = R AND Clear2
232 ——— 100000 100000 100000 100000    signs
                                       SUBTRACT
603 ——— 111011 110111 111111 111000    R = R - Signs
                                       SRA 2
604 ——— 111110 111101 111111 111110    R = R SRA 2
                                       (dependent, -1,-2,0,-2)
```

Fig. 7

```
207 ──  111101 111010 111111 111000    R (dependent -2,-5,0,-8)
231 ──  100000 100000 100000 100000    Mask
                                       AND
232 ──  100000 100000 100000 100000    Signs = R AND Mask
207 ──  111101 111010 111111 111000    R
                                       ADD
233 ──  011110 011011 100000 011000    R = R + Signs
601 ──  111100 111100 111100 111100    Clear 2
                                       AND
602 ──  011100 011000 100000 011000    R = R AND Clear2
232 ──  100000 100000 100000 100000    Signs
                                       XOR
701 ──  111100 111000 000000 111000    R = R XOR Signs
                                       SRL 2
702 ──  001111 001110 000000 001110    R = R SRL 2
                                       ((in)dependent 15,14,0,14)
```

PARALLEL OPERATIONS ON MULTIPLE SIGNED ELEMENTS IN A REGISTER

CROSS REFERENCE TO RELATED APPLICATIONS

The present application is related to and claims priority from Provisional Application 60/616,689 filed on Oct. 7, 2004, the content of which is incorporated herein.

BACKGROUND TO THE INVENTION

1. Field of the Invention

This invention relates in general to data processing, and more particularly to performing parallel operations on multiple signed elements in a single register.

2. Description of the Related Art

In the highly competitive software industry software performance is a key consideration and often a factor by which similar software products differentiate from each other and by which software products are judged by their users. As a result the software industry is constantly looking at ways to improve software performance within the constraints of the hardware available.

In this context data processors function by performing operations on data elements through various registers in accordance with instructions provided by a computer program. For example, a data element is first loaded into a register and an appropriate operation is performed on the register, such an operation taking a single cycle of the processor. For example a register may comprise 8, 16, 32, 64, 128, etc. bits. Example operations include subtract, multiply by a constant, shift left logical, shift right logical, AND, and OR.

In this environment space in a register is often wasted by loading and performing operations on data elements which require a subset of the bits available in a register. For example, if a 16 bit register is used to perform an operation on a 4 bit data element, potentially 12 bits of the register are wasted for a given cycle. Accordingly U.S. Pat. No. 6,834,337 to Mitchell et al. describes how to convert computer processors with wide registers into (effectively) vector scalar processors without any hardware changes. Multiple signed independent elements are packed into a register and an operation performed on all of the elements in parallel. Operations like add, subtract, multiplication by constants, OR, AND, exclusive OR (XOR), and shift left logical only require one cycle independent of the number of elements packed into the register. However, the unpack (convert the dependent values back into independent elements within their allotted precision), repack, reconvert the independent values back into dependent elements), shift right arithmetic (SRA), and shift right logical (SRL) operations were shown as needing loops proportional to the number of elements (for unpack or repack operations) or the number of shifts (for SRA and SRL operations) in order to handle the propagation of the borrows from negative numbers correctly. This created significant overhead that decreased the overall efficiency.

U.S. Ser. No. 10/445,563 to Brady et. al describes a hardware assist to accomplish the PACK, UNPACK, and SRA/SRL operations in less cycles. However, whilst this assist is natural for FPGA designs since the assist did not have to disturb the basic arithmetic logic unit (ALU) design, it is not practical for purely software implementations.

Accordingly there is the need for a more efficient (i.e.: faster) software solution for the execution of unpack, repack, SRL, and SRA operations on a register into which multiple signed elements have been packed.

SUMMARY OF INVENTION

Accordingly, according to a first aspect the present invention provides a method comprising: loading a register binary value with a plurality of elements each element being associated with a different set of bits of the register binary value, at least one element containing a negative value; obtaining a signs binary value from the register binary value, the bits in the bit positions of the signs binary value which correspond to the bit positions of the elements in the register binary value only being set in bit positions which correspond to set sign bits of the elements; and performing at least one operation using the signs and register binary values to produce a final binary value which comprises information from which each element can be fully reconstructed.

According to a second aspect the present invention provides a data processing apparatus comprising: a loader for loading a register binary value with a plurality of elements each element being associated with a different set of bits of the register binary value, at least one element containing a negative value; an obtainer for obtaining a signs binary value from the register binary value, the bits in the bit positions of the signs binary value which correspond to the bit positions of the elements in the register binary value only being set in bit positions which correspond to set sign bits of the elements; and a performer for performing at least one operation using the signs and register binary values to produce a final binary value which comprises information from which each element can be fully reconstructed.

According to a third aspect the present invention provides an article of manufacture comprising a program storage medium readable by a computer, the medium tangibly embodying one or more programs of instructions executable by a computer to perform a method comprising: loading a register binary value with a plurality of elements each element being associated with a different set of bits of the register binary value, at least one element containing a negative value; obtaining a signs binary value from the register binary value, the bits in the bit positions of the signs binary value which correspond to the bit positions of the elements in the register binary value only being set in bit positions which correspond to set sign bits of the elements; and performing at least one operation using the signs and register binary values to produce a final binary value which comprises information from which each element can be fully reconstructed.

According to a fourth aspect the present invention provides a method comprising: producing computer executable program code; providing the program code to be deployed to and executed on a computer system; the program code comprising instructions for: loading a register binary value with a plurality of elements each element being associated with a different set of bits of the register binary value, at least one element containing a negative value; obtaining a signs binary value from the register binary value, the bits in the bit positions of the signs binary value which correspond to the bit positions of the elements in the register binary value only being set in bit positions which correspond to set sign bits of the elements; and performing at least one operation using the signs and register binary values to produce a final binary value which comprises information from which each element can be fully reconstructed.

The final binary value comprises information from which each element can be fully reconstructed in that it fully contains the values of the elements, or, in other words, the values of the elements can be extracted from the final binary value and reconstructed without the need to add additional information.

For example elements may be loaded into the register as independently loaded or dependently loaded elements. Independently loaded elements are fully defined within their associated bits and do not affect the values of other elements in the register. Dependently loaded elements have at least one element which affects the value of at least one other element and is effectively at least partially defined in the at least one other element. This occurs when an element with a negative value is loaded adjacent, or only separated by 0's, to an element in more significant bits. In this case −1 carries from the negative element to at least the adjacent element, in which case the negative element borrows from at least one other element and is therefore partially defined by the bits associated with the at least one other element. However, note that it is not possible to borrow from an element which is set to the highest negative number (i.e: sign bit set and all other bits clear) in which case an element of this value should not be loaded into an element from which a borrow is required.

For example, if the elements are dependently loaded in the register binary value these can be changed in parallel to be independently loaded in the final binary value by performing the operations of adding the signs binary value and register binary value, and then modifying the result of the addition by performing an exclusive OR with the signs binary value. This procedure may be termed "unpacking".

Optionally a parallel shift right logical by a pre-determined number of bits can be performed on each element of the register as part of the unpack procedure. In this case after adding the signs binary value and register binary value the result of the addition is further modified by performing a shift right logical by the predetermined number and clearing the bits which correspond to the predetermined number most significant bits of the elements in the final binary value. In this procedure the final binary value comprises sufficient information to fully reconstruct each element such that each reconstructed element further reflects performance of the shift right logical operation individually on the equivalent element in the register binary value.

When performing a shift right logical as part of the unpack procedure the result of adding the signs binary value and register binary value is modified using three steps in order to produce the final binary value. These steps involve performing a shift right logical, clearing bits, and performing an exclusive OR. However, note that these three steps can be carried out in any order. For example if the bits are cleared before the shift right logical, the bits cleared must be those that will become part of each element in the final binary value after the shift is performed. Alternatively if the bits are cleared after the shift right logical, the cleared bits must be the most significant bits of each element in the final binary value. Similarly the exclusive OR can be performed before or after clearing bits, although if the exclusive OR is performed after the shift right logical this will require a similar shift to be performed on signs binary value before performing the exclusive OR.

For example, if the elements are independently loaded in the register binary value these can be changed in parallel to be dependently loaded in the final binary value by shifting the bit position of the each bit in the signs binary value from a lesser significant position to a more significant position, and subtracting the modified signs binary value from the register binary value to produce the final binary value. This procedure may be termed "packing".

Preferably modifying the signs binary value only requires a shift by one bit of each bit in the signs binary value to the next most significant position. This is possible if the elements are loaded into adjacent bits in the register binary value.

For example if the elements are dependently loaded in the register binary value and dependently loaded in the final binary value, a parallel operation may be performed on each element. This is achieved by adding the signs binary value and the register binary value and then modifying the result of the addition by performing at least one parallel operation and subtracting the signs binary value. In this case the final binary value comprises sufficient information to fully reconstruct each element such that each reconstructed element reflects performance of the parallel operation separately on the equivalent element in the register binary value.

Optionally the at least one parallel operation changes only bit values in the bit positions which do not correspond to the most significant bit positions of each element in the register binary value. In this case no additional modifications to the result of the adding of the signs binary value and register binary value are required to produce the correct result in the final binary value.

Alternatively the at least one parallel operation comprises a shift right arithmetic by a predetermined number of bits. In this case the modifying the result of the adding step further comprises clearing the bits which correspond to the predetermined number most significant bits of the elements in the final binary value. Note that the clearing of bits should be performed before the signs binary value is subtracted.

When the at least one parallel operation is a shift right arithmetic operation, the result of adding the signs binary value and register binary value is modified using three steps to produce the final binary value. These steps involve clearing bits, subtracting the signs bit and performing the shift right arithmetic operation. However, whilst the clearing of bits must precede the subtraction, the shift right arithmetic operation may be performed before or after either of these steps. However, If it is performed before the subtraction this will require a shift right logical by the predetermined number of bits to be performed on the signs binary value before performing the subtraction.

Note that there is no restriction on the number of elements loaded into a register or the relative number of bits associated with each element, although the number of bits allocated to an element should be such that any parallel operation does not cause one element value to overflow the number of its associated bits. Further it is not necessary to use all bits in a register binary value, for example the most significant and/or the least significant bits of the register binary value could be left spare, or spare bits can be left between each element. Further, note that if spare bits are left in the register binary value, the signs binary value, in some scenarios, may have bits set in the bit positions which correspond to bit positions of the spare bits in the register binary value without affecting the final binary value Further note that the tem "register binary value" is not intended to limit the invention to use of a computer register. For example the register binary value could also be maintained in volatile storage.

Further note that providing the program instruction code for deployment to a computer system can be achieved in many different ways. For example the program code could be provided for placement in storage which is accessible to a remote computer system and from which such computer systems can download the program code. For example the storage may be accessible from an internet site or an ftp (file transfer program) site. Alternatively the program code could be provided by transmission to the computer system over a computer network, for example as part of an e-mail or other network message transmission.

BRIEF DESCRIPTION OF THE DRAWINGS

Some of the purposes of the invention having been stated, others will appear as the description proceeds, when taken in connection with the accompanying drawings, in which:

FIG. 2a illustrates loading a register such that it contains multiple dependent packed elements, according to the prior art;

FIG. 2b illustrates modifying a packed register which contains multiple dependent elements to contain multiple independent elements, according to the prior art;

FIG. 2c illustrates an alternative method for modifying a packed register which contains multiple dependent elements to contain multiple independent elements, but at the expense of the sign bits, according to the prior art;

FIG. 3 illustrates modifying a packed register which contains multiple dependent elements to an unpacked register which contains multiple independent elements, according to the preferred embodiment of the present invention;

FIG. 4 illustrates modifying an unpacked register which contains multiple independent elements to a packed register which contains multiple dependent elements, according to the preferred embodiment of the present invention;

FIG. 5 illustrates performing a parallel operation on a packed register which contains multiple dependent elements, according to the preferred embodiment of the present invention;

FIG. 6 illustrates performing a parallel shift right arithmetic operation on a packed register which contains multiple dependent elements, according to the preferred embodiment of the present invention; and FIG. 7 illustrates performing a parallel shift right logical operation on a packed register which contains multiple dependent elements, according to the preferred embodiment of the present invention;

DETAILED DESCRIPTION OF THE ILLUSTRATIVE EMBODIMENTS

Figure 1:
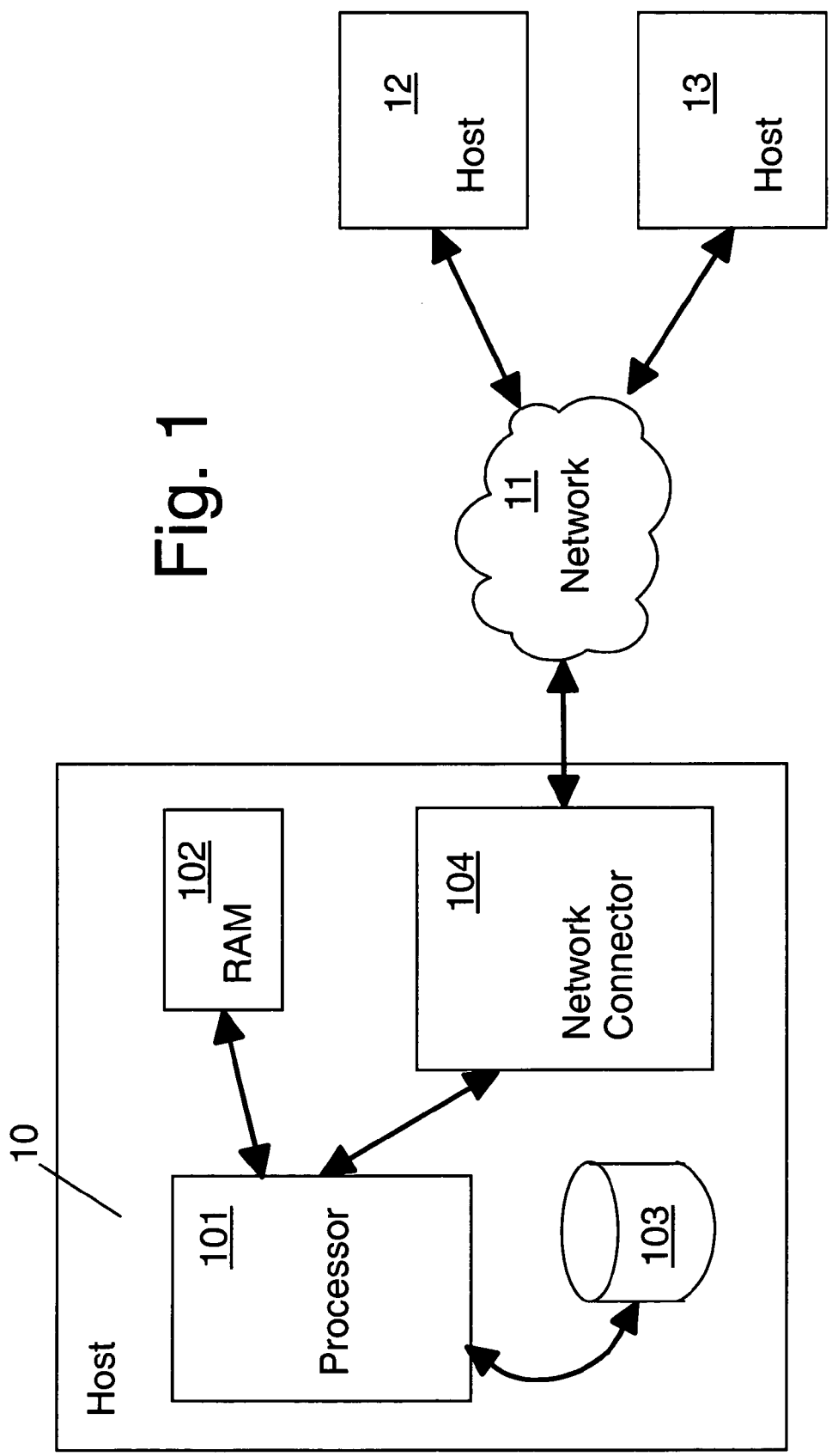
FIG. 1 is a schematic diagram of an example data processing system to which the preferred embodiment of the present invention could be advantageously applied.

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

FIG. 1 is a block diagram of an example data processing environment in which the preferred embodiment of the present invention could be advantageously applied. In FIG. 1, a client/server data processing host 10 is connected to other client/server data processing host 12 and 13 via a network 11, which could be, for example, the Internet. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13. For example client/server 10 may have program instruction code in non-volatile memory 103 to carry out a method of the preferred embodiment of the present invention, execution of such program code being performed by processor 101 and involving use to RAM volatile memory element 102.

FIGS. 2a and 2b are diagrams which show an example of how multiple signed independent elements are packed into a single binary register and unpacked from a single binary register, respectively, according to prior art U.S. Pat. No. 6,834,337. In FIG. 2a values −2, −5, 0 and −8 are packed into a single 24 bit register, each value being assigned 6 bits. In order to accomplish this, first the value of −2 is shifted 18 bits to the left to produce value 201 and the value of −5 is shifted 12 bits to the left to produce value 202, and these are then added to produce a first intermediate value 203. The value of 0 is then shifted 8 bits to the left to produce value 204 and this is added to first intermediate value 203 to produce second intermediate value 205. The value of −8 (206) is then added to the second intermediate value 205 and this produces the final packed register 207 which contains a binary value which comprises 4 dependent elements, each associated with a different set of bits of the binary value, and containing the values, reading left to right, of −2, −5, 0, and −8, respectively.

Note that in generating the final packed register the sign bit of an element is carried into the elements to the left. For example when the −5 element is added to the right of the leftmost element −2, looking at the 6 most significant bits (those which correspond to the −2 element) of values 201 and 202, "111110" (i.e.: −2) is added to "111111" (i.e.: −1) to produce "111101" (i.e.: −3) in the 6 most significant bits of value 203. Similarly when −8 is added as the right most element, looking at the 18 most significant bits (i.e.: those which correspond to the elements to the left of the −8 element) of values 205 and 206, "111101111011000000" (i.e.: −8512) is added to "111111111111111111" (i.e.: −1) to produce "111101111010111111" (i.e.: 8513). Accordingly the elements in the packed register are dependently loaded because some elements are dependent on the value of one or more elements to its right.

FIG. 2b shows the packed binary value 207 of FIG. 2a being unpacked according to the prior art. Note that in the unpacked register the elements are independent which means that each element contains only its own value and each element can be reproduced in a register by loading all bits of the element into the least significant bits of the register and setting the remaining most significant bits of the register to the same bit value as the leftmost bit of the element (i.e.: the sign bit). This prior art unpack is effectively the reverse of the packing procedure and is achieved by recursively, working from right to left, adding the sign of a right value to the least significant bit of the left adjacent elements. Thus, for a negative element, this adds back the 1 that was subtracted from the left elements when packing. Accordingly a sign mask 210, which contains a "1" bit only in the bit position which corresponds to the sign bit position of the right most element (−8), is ANDed with the packed value 207 and this produces a sign value 211. This sign value 211, because the −8 element is negative and has its sign bit set to "1", contains a "1" bit only in the bit position which corresponds the sign bit of the right most element. Value 211 is then shifted one bit to the left to produce value 212 which is then added to the packed value 207 to produce value 213 in which the right most element is now independent of the other elements. Note that the value 211 is equal to 32, but looking at only the 18 most significant bits of values 212 and 207, this results in "000000000000000001" (i.e.: 1) being added to "111101111010111111" (i.e.: −8513) to produce "111101111011000000" (i.e.: −8512), which is the value that was in these 24 bits in value 205 of FIG. 2a before the right most element (−8) was added to the packed register. Thus the elements in these 18 bits are no longer dependent on the rightmost element.

This procedure is then repeated for the next element to the left using sign mask 214 (which may be created, for example, by shifting sign mask 210 six bits to the left) to produce sign value 215 which is shifted one bit to the left to produce value 216. value 216 is then added to value 213 to produce value 217 in which the two right most elements are now independent of the other elements. The procedure is then repeated for the next element to the left using sign mask 218 to produce sign value 219 which is shifted one bit to the left to produce value 220. Value 220 is then added to value 217 to produce value 221 which is a binary value which comprises 4 independent elements, each associated with a different set of bits of the binary value. Note that the procedure need not be repeated for the left most element because it has no value to the left to which its sign bit needs to be added. Further note that in value 207 the sign bit of the element to the left of the right most element is set, whereas in value 213, from which the sign bit of this element is obtained, the sign bit is clear. This indicates why the process must be recursive. Further note that whilst, in the example, sign value 215 is zero which results in the values 213 and 217 being the same, the procedure is still followed because the alternative would be to check every sign value against zero which would be less efficient.

Further in the prior art it was recognized that, the recursive loop can be avoided if restoration of the sign bits of each element is not required. In this case the sign bits of the elements from a register packed with multiple dependent elements can be added back into the register, and this generates a carry into the next element to the left and leaves a zero in the sign bit position, for elements with negative signs (e.g. '1' bits), and does nothing for positive signs (e.g. '0' bits) with the exception of 0 value element with a negative right neighbor where it leaves a "1" in the sign position. An example which illustrates this procedure is shown in FIG. 2c in which the starting value 207 is the value 207 which was obtained in FIG. 2a, and which was used as the starting value in FIG. 2b. Firstly this value, which is stored in register R, is ANDed with a register containing a sign mask value 231 which has set bits only in the bit positions which correspond to the most significant bits (i.e.: the sign bits) of each element in R. This produces a signs binary value 232 which contains only the sign bits of the dependent elements and, in this example, because each dependent element in R has a "1" in its sign bit position, the signs binary value 232 is the same as the mask value 231. The signs binary value 232 is then added to value 207 to produce value 233 in which the elements are now independent but the sign bit of each element has been destroyed, that is in this example, the elements which should have a "1" in the sign bit position (negative elements) have a "0" in the sign bit position, and 0 value element which should have a "0" in the sign bit position has a "1" in the sign bit position.

Note that the value of 233 can be explained by looking at the difference in the values added to the packed register in FIGS. 2b and 2c. In FIG. 2b the values 211 and 220 are added to the packed register. Value 212 is equal to 64 and value 220 is equal to 262,144 and therefore changing packed value 207 to unpacked value 217 can be achieved in this example by adding 262,208 to value 207. However, in FIG. 2c value 232 is added to value 207, and this is equal to −8,255,456, and further an overflow occurs in this addition and the resulting loss of what would have been a 25.sup.th bit is equivalent to adding a further 16,777,216 to value 207. Thus the net addition to value 207 as a result of adding value 232 is 8,521,760, and this is 8,259,552 more than the value of 262,208 which is required to convert value 207 to value 221. Accordingly value 233 can be converted to value 221 (i.e.: the unpacked value with sign bits restored) by subtracting 8,259,552. One way this may be achieved is to add a value with bits set only in the bit positions which correspond to the sign bit positions of the negative elements, such a value being equal to −8,257,504, and subtract a value with a bit set only in the bit position which correspond to the sign bit position of the positive element, such a value being equal to 2,048. Thus what is missing in value 233 is "1" in the sign bit positions of the negative elements and what is extra is a "1" in the sign bit position of the positive elements.

However, the present invention overcomes the shortcomings of the prior art by taking advantage of the fact that, for example, when adding sign bits back into a register packed with multiple dependent elements, the sign bits are retained in the register used to add in the sign bits. Accordingly in the preferred embodiment of the present invention the sign bit register is used in a variety of scenarios in order to reduce the number of operations required when working with multiple dependent and independent elements which have been packed into a register.

For example, in the preferred embodiment of the present invention the procedure for parallel unpacking of multiple dependent elements already loaded in R, whilst preserving the sign bits involves the following steps:
 Step 1: Signs=R AND Mask
 Step 2: R=R+Signs
 Step 3: R=R XOR Signs These steps are illustrated by example in FIG. 3 using a register R which comprises the binary value 207 which resulted from the procedure described with reference to FIG. 2a. However first two steps which produce the binary value 233 are described with reference to FIG. 2c and will not be described again here. In binary value 233 the elements are independent but the sign bits for each element have been reversed. However the sign bits are restored using a single operation in step 3 in which the signs binary value 232 is Exclusive-OR'ed (XOR'ed) with the binary value 233 which is now loaded in R. Note that if two bits which are XOR'ed have the same value the result is "0" and if they have different values (i.e.: "1" and "0") the result is "1,". Accordingly this step restores the destroyed sign bits of the negative elements by resetting sign bits set to "0", to "1" (effectively adding −8257504 to value 232) and resetting the 0 element sign bit set to "1" to "0" (effectively subtracting 2048 from value 232). As a result the resultant final binary value 221 is the same value as produced in FIG. 2b, that is a binary value in which the dependent elements in value 207 are independent elements.

Note that whilst the example of FIG. 2b comprises 9 steps, 3 for each element with an element to its left, the example of FIG. 3 comprises only 3 steps and produces the same effect (changes value 207 to value 221). This will also be the case for any size register into which four dependent elements are loaded. Further, in many cases the size of the register and number of dependent elements in the register will be greater than shown in the examples, and in such cases whilst the number of steps based on the procedure of FIG. 2b will increase for each additional element, the number of steps based on the procedure of FIG. 3 will not.

Further, note that the example in FIG. 3 does not illustrate an element with a positive value greater than 0. When such an element is packed as a dependent element with a negative right adjacent element, this results in a carry of the sign bit into the positive element which reduces it by 1. However, because the positive element is greater than 0 it will remain positive and as a result its sign bit will remain set to "0". Accordingly the appropriate signs binary value will have a "0" in the bit position which corresponds to the sign bit of the positive element and as a result when the signs binary value is XOR'ed with the register value, with regard to the sign bit position of the positive element, this will involve a "0" being XOR'ed with "0" producing a result of "0".

For example, in the preferred embodiment of the present invention the procedure for parallel packing of multiple independent elements already loaded in R involves the following steps:

Step 1: Signs=R AND Mask
Step 2: Signs=Signs SLL 1
Step 3: R=R−Signs

These steps are illustrated by example in FIG. 4 in which the starting binary value 221, which is loaded into register R, is the value 221 obtained in FIGS. 2b and 3. In step 1 this value is AND'ed with a register containing a sign mask value 231 which has set bits only in the bit positions which correspond to the most significant bits (i.e.: the sign bits) of each element in R. This produces a signs binary value 401 which, in this example, only has set bits in the $6^{th}$, $18^{th}$ and $24^{th}$ bit positions (counting right to left), these positions corresponding to the sign bits of the negative elements −8, −5 and −2, respectively (i.e.: the sign bits which are set). In step 2 the obtained signs binary value 401 is shifted left logical (SLL) by one bit position to produce value 402 in which each "1" bit of value 401 is moved to a bit position which corresponds to the least significant bit of the element to the left of the element for which the "1" bit corresponds to its sign bit. Further the "1" which corresponds to a sign bit of the leftmost element is lost. In step 3 the value 402 is subtracted from R which contains value 221. This has the effect of carrying the sign bit of an element into the element to its immediate left and results in a final binary value which reproduces the value 207, which comprises multiple dependent elements, in register R.

Note that from the process of FIG. 4 it is possible to turn binary value 207 with multiple dependent elements back into binary value 221 with multiple independent elements simply by adding the signs binary value 402 back to binary value 207. This is possible because, whereas signs binary value 232 in FIG. 3 comprises the sign bit values of the dependent elements, the signs binary value 402 comprises the sign bits values of the independent elements, shifted one bit position to the left.

For example, in the preferred embodiment of the present invention the procedure for parallel unpacking and repacking of multiple dependent elements already loaded in R, where an operation, which does not change the sign bits of the independent elements is performed between the unpack and repack, involves the following steps:

Step 1: Signs=R AND Mask
Step 2: R=R+Signs
Step 3: Operations which do not alter the sign bits of independent elements
Step 4: R=R−Signs These steps are illustrated by example in FIG. 5 using a register R which comprises the binary value 207 which resulted from the procedure described with reference to FIG. 2a. However the first two steps are the same as the steps described with reference to FIG. 2c and will not be described again here. The output value 233 of these first two steps contains independent values but with the sign bit of each element destroyed. In the third step one or more operations may be performed on each element in R in parallel, the only requirement of this procedure being that the operation(s) do not change the sign bit values of any element in 233, which in this example means that the 6.sup.th, 12.sup.th, 18.sup.th and 24.sup.th (counting right to left) bit values must not be changed. In the example of FIG. 5, in step 3 a single OR operation is performed between R and mask value 501 which has bits set only in the bit positions which correspond to the least significant bit of each element in R. This operation effectively performs the same operation on each element in parallel and the resultant binary value 502 comprises the values of each independent element after the operation, but with the sign bits of each operation destroyed (as a result of step 2). The fourth step then returns R to a packed version with dependent elements by subtracting the signs binary value 232 from value 502 to produce final binary value 503. This step effectively undoes the second step by restoring the destroyed sign bits and restoring the carry of the sign bits of an element to the element immediately to its left. Accordingly the resulting final binary value 503 contains packed dependent elements the values of which would be the same if a shift right logical operation was performed individually on each element. However, note that if step 4 was changed to performing an XOR of the signs binary value 232 and value 502, this would restore the destroyed sign bits but would not restore the carry of the sign bit of an element to the element to its immediate left, and as a result the final binary value would comprise unpacked independently loaded elements.

Further note that in FIG. 5 whilst an OR is performed at step 3 this is only an example of an operation which can be used without altering the sign bits of the elements. A skilled person will realize that many alternative operations could be used such as AND, XOR, add, and subtract provided care was taken not to affect the sign bits.

For example, in the preferred embodiment of the present invention the procedure for parallel Shift Right Arithmetic (SRA) by N of multiple dependent elements already loaded in R involves the following steps:

Step 1: Signs=R AND Mask
Step 2: R=R+Signs
Step 3: R=R AND ClearN
Step 4: R=R−signs
Step 5: R=R SRAN These steps are illustrated by example in FIG. 6 for an SRA where N=2 and in which register R comprises the binary value 207 which resulted from the procedure described with reference to FIG. 2a. Note that when an SRA by N is performed on a value, the N least significant N bits of the value are truncated and N most significant bits are added which are each set to the same value of the most significant bit of the unshifted value.

In FIG. 6 the first two steps are the same as those described with reference to FIG. 2b and will not be described again here. At step 3 the N least significant bits of each element in R are set to 0, N being the size of the SRA, by performing an AND of R and a bit mask ClearN which has 0's in the bit positions which correspond to the N least significant bits of each element and 1's in all other bit positions. For example, when performing an SRA by 2, the least significant 2 bits of each element are cleared, these bits corresponding to the bits that would be lost if an SRA by 2 was performed on an element in isolation, and further, for an element with another element to its right, the two bits that will become part of the element to the right as a result of the shift. Accordingly value 233 is AND'ed with value 601 which has all bits set apart from the bits in bit positions which correspond to the bit positions of the two least significant bits of each element loaded into R, these bits being clear. This results in value 602 which is value 233 but with the two least significant bits of each element set to 0. However note that clearing the two least significant bits from the right most value is not necessary as these will be truncated by step 5. In step 4 the signs binary value 232 is subtracted from value 602 to produce value 603. This subtracts from R what was added at step 2 and thus reintroduces the carry of the sign bit value of a negative element into the elements to its left. Further because in value 602 each negative element has its sign bit value reversed, this causes the two least significant bits of an element to the immediate left of a negative right neighbor to be set to "1", whereas the least significant bits of an element to the immediate left of a positive right neighbor remain unchanged. Accordingly this effectively moves the boundary of each element by 2 bit positions to the left and all but the leftmost element has the value which would result from an SRA by 2 of its value in isolation (assuming the right boundary of the rightmost element has moved two positions to the left). Step 5 then performs an SRA by 2 of value 603 which moves the element boundaries back 2 bit positions to the right, drops the two least significant bits of the right most value, and introduces two new most significant bits which are set to the same value as the most significant bit of value 603. This results in final binary value 604 which contains dependent elements each with the value which it would have if first a separate SRA by 2 was performed on each of them, and second the resultant elements were packed into a register using, for example, the method described with reference to FIG. 2*a*.

Note that in the procedure described with reference to FIG. 6 the order of the steps can be varied. For example $5^{th}$ step could be performed between the $2^{nd}$ and $3^{rd}$ steps or between the $3^{rd}$ and $4^{th}$ steps. For example, if the $5^{th}$ step is performed before the $3^{rd}$ step, the $3^{rd}$ step would need to be changed clear the two most significant bits from each element. Accordingly note that the purpose of step 3 is to clear the bits which correspond to the most significant bits of each element in the final binary value 604. For example if the $5^{th}$ step is performed before the $4^{th}$ step, a shift right logical by 2 bytes of the signs binary value would also need to be performed before performing the $4^{th}$ step.

For example, in the preferred embodiment of the present invention the procedure for parallel Shift Right Logical (SRL) by N of multiple dependent elements already loaded in R involves the following steps:

Step 1: Signs=R AND Mask
Step 2: R=R+Signs
Step 3: R=R AND Clear N
Step 4: R=R XOR Signs
Step 5: R=R SRL N These steps are illustrated by example in FIG. 7 for an SRL by 2 of a register R comprising the binary value 207 which resulted from the procedure described with reference to FIG. 2*a*. Note that when an SRL by N is performed on a value, the N least significant bits of the value are truncated and N most significant bits are added each set to "0".

In FIG. 7 the first three steps are the same as the first three steps described with reference to FIG. 6 and will not be described again here. In value 602 which is the output of Step 3, the sign bits of each element have been reversed and the 2 least significant bits of each element have been set to "0". At step 4 an XOR is performed between value 602 and the signs binary value 232 to produce value 701 in which the sign bits have been restored, and this completes the unpack procedure which was started by steps 1 and 2. Finally at step 5 an SRL by 2 is performed on value 701 to produce final binary value 702 in which the most significant 2 bits of a right element now contain the previous 2 least significant bits of a left neighbor (which were cleared by step 3), and the most significant bits of the leftmost element are set to "0". This effectively performs an SRL by 2 of each element, and leaves the values as independent elements in register R. However, note that in this case, because all elements in R have positive values (which is an inevitable result of an SRL), it is not possible for these to be dependent elements because there are no sign bits to carry into an element to the left.

Note that in the procedure described with reference to FIG. 7 the order of the 3rd, $4^{th}$, and $5^{th}$ steps can be changed to any other order. For example the $4^{th}$ step could be performed before the $3^{rd}$ step with no change to either step. For example, if the $5^{th}$ step is performed before the $3^{rd}$ step, the $3^{rd}$ step would need to be changed clear the two most significant bits from each element, although this would be unnecessary for the leftmost element because it's most significant bits will be cleared by the $5^{th}$ step. Further, for example, if the $5^{th}$ step is performed before the $4^{th}$ step, a shift right logical by 2 bytes of the signs binary value would also need to be performed before performing the $4^{th}$ step.

Note that whilst the preferred embodiment has been described using a 24 bit register loaded with 4 elements each element comprising 6 bits, in other embodiments the size of the register and/or the number of elements and/or the size of the elements may be varied. Further, for a given register different elements may be given different sizes. For example a 32 bit register could be loaded with 3 elements one element having a size of 6 bits, another element having a size of 12 bits and the other element having a size of 14 bits. In such embodiments it is necessary that the bit mask, such as bit mask 231 of FIG. 2*c* to have "1"s only in the bit position which correspond to the most significant bit of each element.

Further in another embodiment the elements may not occupy all bits of the register, leaving some bits spare. For example spare bits can be left between elements or in the most significant or least significant bits of the register. In understanding how this may affect the preferred embodiment of the present invention any spare bits can be considered to be the least significant bits of the left adjacent element.

Further note that the preferred embodiment of the present invention has been described in terms of a register in which the least significant bit is on the right, the most significant bit is on the left, and the sign bit of a right element carries into the element to its immediate left. However a skilled person will realize that the preferred embodiment of the present invention could be applied to any other mappings of a register. Accordingly, in respect of bit positions, the preferred embodiment uses "left" to mean more significant and "right" to mean less significant. For example a carry from a right element to a left adjacent element can be considered as a carry from an element loaded in lesser significant bits to an adjacent element in more significant bits. Further where the preferred embodiment describes a leftmost or rightmost element or bit, these can be considered the elements or bit loaded in the most significant and least significant bits of the register, respectively.

Further note that the preferred embodiment of the invention has been described such that, in general, the result of operations which change the value of the starting register (R) have been kept in the same register (R), for example see the final step of each procedure described with reference to FIGS. 3, 4, 5, 6 and 7. However in other embodiments the result could alternatively be kept in the register which contains the value which is being used to modify the R value.

Further note that whilst the preferred embodiment has been described wherein the binary values are loaded into registers, in another embodiment the binary values could be maintained, and operated upon, from any volatile storage. Accordingly where each procedure described with reference to FIGS. 3 to 7, starts and ends with a binary value loaded in a register, these may be considered more generally to be an initial binary value and a final binary value, respectively.

In summary, in the prior art is was recognized that the sign bits, when added back into the sign bits in a register containing multiple dependent elements, generate a carry into the next element to the left for negative signs (e.g. '1' bits) leaving zero in the sign position and do nothing for positive signs (e.g. '0' bits). However the prior art also was assumed that the sign bit was destroyed forever. However, the present invention takes advantage of the fact that the sign bit is preserved in the second register. When ready to repack, these sign bits can be subtracted from the register. This will restore the sign bits and propagate that sign to any cleared bits to the left as a borrow for sign bits of '1'. Also, in the prior art borrows through zero-valued elements are handled one at a time. However the present invention recognizes that the cleared sign bit of a zero-valued element with a negative right neighbor (thus previously converted to a negative one) captures the carry bit in the sign position after it has propagated from right to left through the rest of the '1's. Thus subtracting the '1' sign bit from this carry cancels it and does not propagate further to the left. The zero value elements will only be converted back to negative one if their neighbor to the right is negative.

When the elements are packed, negative values borrow one (i.e. subtract 1) from their left-adjacent neighboring element. Since the most negative value is not allowed, there will always be something to borrow from except for a value of zero. In that case the borrow converts the zero to a negative one and the borrow propagates to the next element to the left of the former zero. Since there can be multiple zeros in adjacent values, the borrow propagates until it reaches a nonzero value or generates an underflow out the most significant bit in the register. When the sign bit is added back into the register, the elements are made independent except that the sign bit has been cleared for all non-zero values. The "zero" elements will have a carry in the sign bit position if the element to the right is negative because its overflow rippled through the negative one until it hit the cleared sign bit. Note that the sign of a zero with a borrow from its negative neighbor to the right is guaranteed to start as a '1' bit.

When the signs are subtracted from the sign position, the elements are repacked and ready for simultaneous operations. Cleared negative sign bits are reset to "1" and a borrow propagates to the left. The "carry" bit in the sign position of "zero" valued elements that have a negative neighbor on the right are cleared and do not generate a borrow. These "zero" values will only be reconverted to negative one if a non-zero element to the right generates a borrow that is not stopped by a non-zero value. To reset the sign bits while unpacking into independent elements, the sign bits are XOR into the sign positions. The cleared sign bits will be either reset for negative signs or left alone for positive values. The carry bits in the sign position of "zero" values previously converted to negative numbers by a borrow will be cleared by this operation which can be executed in parallel.

Note that the preferred embodiment of the present invention has been described in terms of program instructions which use registers without any special purpose or dedicated hardware assists. However, saving the sign bits in a second register and then using them in parallel could also be implemented as a special purpose hardware assist. Today's Field Programmable Gate Arrays (FPGAs), ASIC cores, or even dedicated chips could take advantage of the flexibility to set the boundary between elements in the register Mask and then ANDing it with the elements to make a copy of the sign bits for each element. This would simplify the hardware since it removes the necessity for high speed loops. Since these operations can be built around the arithmetic logic unit (ALU), the library designs for the ALUs are not disturbed.

Note that a skilled person in the art will realize that the methods described with reference to FIGS. 3 to 7 could be implemented in a variety of programming languages, for example, assembler, Java™, C, and C++ (Java is a registered trademark of Sun Microsystems, Inc. in the United States, other countries, or both). Further a skilled person will realize that once implemented the methods can be stored in a computer program product comprising one or more programs, in source or executable form, on a media, such as floppy disk, CD, and DVD, suitable for loading onto a data processing host and causing the data processing host to carry out the methods.

Accordingly the present invention provides methods, apparatus, and article of manufacture for performing parallel operations on multiple signed elements which have been packed into a binary value, each element being associated with a different set of bits. A signs binary value is obtained which contains the sign bits for each element in the register. The signs binary value is then used to remove and/or restore sign bits to each element in single operations. This enables parallel operations to be performed efficiently on multiple signed elements loaded into a register, without incurring loss of data.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method performed by a processor, the method comprising:
    loading into a register of the processor a register binary value with a plurality of elements each element being associated with a different set of bits of the register binary value, at least one element containing a negative value;
    obtaining a signs binary value from the register binary value, the bits in the bit positions of the signs binary value which correspond to the bit positions of the elements in the register binary value only being set in bit positions which correspond to set sign bits of the elements; and
    performing at least one operation using the signs and register binary values to produce a final binary value which comprises information from which each element can be fully reconstructed.

2. The method of claim 1 wherein the elements are dependently loaded in the register binary value and independently loaded in the final binary value, and performing at least one operation comprises: adding the signs binary value and register binary value; and modifying the result of the adding step by performing an exclusive OR with the signs binary value.

3. The method of claim 2 wherein modifying the result of the adding step further comprises: performing a shift right logical by a predetermined number; and clearing the bits which correspond to the predetermined number most significant bits of the elements in the final binary value; wherein the final binary value comprises sufficient information to fully reconstruct each element such that each reconstructed element further reflects performance of the shift right logical operation individually on the equivalent element in the register binary value.

4. The method of claim 3 further comprising:
performing a shift right logical of the signs binary value wherein the step performing an exclusive OR with the signs binary value, uses the shifted signs binary value.

5. The method of claim 1 wherein the elements are independently loaded in the register binary value and dependently loaded in the final binary value, and performing at least one operation comprises: modifying the signs binary value by shifting the bit position of the each bit in the signs binary value from a lesser significant position to an adjacent more significant position; and subtracting the modified signs binary value from the register binary value to produce the final binary value.

6. The method of claim 1 wherein the elements are dependently loaded in the register binary value and the dependently loaded in the final binary value, and performing at least one operation comprises: adding the signs binary value and the register binary value; and modifying the result of the adding step by: performing at least one parallel operation on each element in the result of the adding; and subtracting the signs binary value; wherein the final binary value comprises sufficient information to fully reconstruct each element such that each reconstructed element reflects performance of the parallel operation separately on the equivalent element in the register binary value.

7. The method of claim 6 wherein the at least one parallel operation changes only bit values in the bit positions which do not correspond to the most significant bit positions of each element in the register binary value.

8. The method of claim 6 wherein: performing at least one parallel operation comprises performing a shift right arithmetic by a predetermined number of bits; modifying the result of the adding step further comprises clearing the bits which correspond to the predetermined number most significant bits of the elements in the final binary value; and the final binary value comprises sufficient information to fully reconstruct each element such that each reconstructed element further reflects performance of the shift right operation individually on the equivalent element in the register binary value.

9. The method of claim 8 further comprising: performing a shift right logical by the predetermined number of the signs binary value; wherein the subtracting step subtracts the result of the shift right logical operation.

10. The method of claim 1 wherein number of bits associated with each of at least two elements are different.

11. A data processing apparatus comprising:
a memory element; and
a processor comprising:
 a register;
 a loader for loading into the register of the processor a register binary value with a plurality of elements each element being associated with a different set of bits of the register binary value, at least one element containing a negative value;
 an obtainer for obtaining a signs binary value from the register binary value, the bits in the bit positions of the signs binary value which correspond to the bit positions of the elements in the register binary value only being set in bit positions which correspond to set sign bits of the elements; and
 a performer for performing at least one operation using the signs and register binary values to produce a final binary value which comprises information from which each element can be fully reconstructed.

12. The apparatus of claim 11 wherein the elements are dependently loaded in the register binary value and independently loaded in the final binary value, and the performer comprises: an adder for adding the signs binary value and register binary value; and a modifier for modifying the result of the adding step by performing an exclusive OR with the signs binary value.

13. The apparatus of claim 12 wherein the modifier comprises: a logical shifter for performing a shift right logical by a predetermined number; and a clearer for clearing the bits which correspond to the predetermined number most significant bits of the elements in the final binary value; wherein the final binary value comprises sufficient information to fully reconstruct each element such that each reconstructed element further reflects performance of the shift right logical operation individually on the equivalent element in the register binary value.

14. The apparatus of claim 11 wherein the elements are independently loaded in the register binary value and dependently loaded in the final binary value, and the performer comprises: a modifier for modifying the signs binary value by shifting the bit position of the each bit in the signs binary value from a lesser significant position to an adjacent more significant position; and a subtracter for subtracting the modified signs binary value from the register binary value to produce the final binary value.

15. The apparatus of claim 11 wherein the elements are dependently loaded in the register binary value and the dependently loaded in the final binary value, and the performer comprises: an adder for adding the signs binary value and the register binary value; and a modifier for modifying the result of the adding step by: performing at least one parallel operation on each element in the result of the adding; and subtracting the signs binary value; wherein the final binary value comprises sufficient information to fully reconstruct each element such that each reconstructed element reflects performance of the parallel operation separately on the equivalent element in the register binary value.

16. The apparatus of claim 15 wherein: the at least one parallel operation comprises a shift right arithmetic by a predetermined number of bits; the modifier further comprises a clearer for clearing the bits which correspond to the predetermined number most significant bits of the elements in the final binary value; and the final binary value comprises sufficient information to fully reconstruct each element such that each reconstructed element further reflects performance of the shift right operation individually on the equivalent element in the register binary value.

17. The apparatus of claim 16 further comprising:
a logical shifter for performing a shift right logical operation by the predetermined number of the signs binary value; and
a subtracter for subtracting the result of the shift right logical operation.

18. An article of manufacture comprising a program storage medium readable by a computer, the medium tangibly embodying one or more programs of instructions executable by a computer to perform a method comprising: loading a register binary value with a plurality of elements each element being associated with a different set of bits of the register binary value, at least one element containing a negative value; obtaining a signs binary value from the register binary value, the bits in the bit positions of the signs binary value which correspond to the bit positions of the elements in the register binary value only being set in bit positions which correspond to set sign bits of the elements; and performing at least one operation using the signs and register binary values to produce a final binary value which comprises information from which each element can be fully reconstructed.

19. The article of manufacture of claim 18 wherein the elements are dependently loaded in the register binary value and independently loaded in the final binary value, and performing at least one operation comprises: adding the signs binary value and register binary value; and modifying the result of the adding step by performing an exclusive OR with the signs binary value.

20. The article of manufacture of claim 19 wherein modifying the result of the adding step further comprises: performing a shift right logical by a predetermined number; and clearing the bits which correspond to the predetermined number most significant bits of the elements in the final binary value; wherein the final binary value comprises sufficient information to fully reconstruct each element such that each reconstructed element further reflects performance of the shift right logical operation individually on the equivalent element in the register binary value.

21. The article of manufacture of claim 18 wherein the elements are independently loaded in the register binary value and dependently loaded in the final binary value, and performing at least one operation comprises: modifying the signs binary value by shifting the bit position of the each bit in the signs binary value from a lesser significant position to an adjacent more significant position; and subtracting the modified signs binary value from the register binary value to produce the final binary value.

22. The article of manufacture of claim 18 wherein the elements are dependently loaded in the register binary value and the dependently loaded in the final binary value, and performing at least one operation comprises: adding the signs binary value and the register binary value; and modifying the result of the adding step by: performing at least one parallel operation on each element in the result of the adding; and subtracting the signs binary value; wherein the final binary value comprises sufficient information to fully reconstruct each element such that each reconstructed element reflects performance of the parallel operation separately on the equivalent element in the register binary value.

23. The article of manufacture of claim 22 wherein: performing at least one parallel operation comprises performing a shift right arithmetic by a predetermined number of bits; modifying the result of the adding step further comprises clearing the bits which correspond to the predetermined number most significant bits of the elements in the final binary value; and the final binary value comprises sufficient information to fully reconstruct each element such that each reconstructed element further reflects performance of the shift right operation individually on the equivalent element in the register binary value.

24. The article of manufacture of claim 23 further comprising: performing a shift right logical by the predetermined number of the signs binary value; wherein the subtracting step subtracts the result of the shift right logical operation.

25. A method comprising:
producing computer executable program code;
providing the program code on a program storage medium for deployment to and executed on a computer system;
the program code comprising instructions for:
loading a register binary value with a plurality of elements each element being associated with a different set of bits of the register binary value, at least one element containing a negative value;
obtaining a signs binary value from the register binary value, the bits in the bit positions of the signs binary value which correspond to the bit positions of the elements in the register binary value only being set in bit positions which correspond to set sign bits of the elements; and
performing at least one operation using the signs and register binary values to produce a final binary value which comprises information from which each element can be fully reconstructed.

26. The method of claim 25 wherein the elements are dependently loaded in the register binary value and independently loaded in the final binary value, and performing at least one operation comprises: adding the signs binary value and register binary value; and modifying the result of the adding step by performing an exclusive OR with the signs binary value.

27. The method of claim 26 wherein modifying the result of the adding step further comprises: performing a shift right logical by a predetermined number; and clearing the bits which correspond to the predetermined number most significant bits of the elements in the final binary value; wherein the final binary value comprises sufficient information to fully reconstruct each element such that each reconstructed element further reflects performance of the shift right logical operation individually on the equivalent element in the register binary value.

28. The method of claim 25 wherein the elements are independently loaded in the register binary value and dependently loaded in the final binary value, and performing at least one operation comprises: modifying the signs binary value by shifting the bit position of the each bit in the signs binary value from a lesser significant position to an adjacent more significant position; and subtracting the modified signs binary value from the register binary value to produce the final binary value.

29. The method of claim 25 wherein the elements are dependently loaded in the register binary value and the dependently loaded in the final binary value, and performing at least one operation comprises: adding the signs binary value and the register binary value; and modifying the result of the adding step by: performing at least one parallel operation on each element in the result of the adding; and subtracting the signs binary value; wherein the final binary value comprises sufficient information to fully reconstruct each element such that each reconstructed element reflects performance of the parallel operation separately on the equivalent element in the register binary value.

30. The method of claim 29 wherein: performing at least one parallel operation comprises performing a shift right arithmetic by a predetermined number of bits; modifying the result of the adding step further comprises clearing the bits which correspond to the predetermined number most significant bits of the elements in the final binary value; and the final binary value comprises sufficient information to fully reconstruct each element such that each reconstructed element further reflects performance of the shift right operation individually on the equivalent element in the register binary value.

31. The method of claim 30 further comprising: performing a shift right logical by the predetermined number of the signs binary value; wherein the subtracting step subtracts the result of the shift right logical operation.

* * * * *

UNITED STATES PATENT AND TRADEMARK OFFICE
CERTIFICATE OF CORRECTION

PATENT NO.       : 7,653,674 B2                                         Page 1 of 1
APPLICATION NO. : 11/068328
DATED            : January 26, 2010
INVENTOR(S)      : Joan LaVerne Mitchell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1355 days.

Signed and Sealed this

Twenty-third Day of November, 2010

David J. Kappos
*Director of the United States Patent and Trademark Office*